US010834095B2

(12) United States Patent
Irazabal et al.

(10) Patent No.: US 10,834,095 B2
(45) Date of Patent: Nov. 10, 2020

(54) POST-COMMIT VALIDATION IN A DISTRIBUTED LEDGER

(71) Applicant: International Business Machines Corporation, Armonk, NY (US)

(72) Inventors: Jeronimo Irazabal, Buenos Aires (AR); Andres Garagiola, Buenos Aires (AR); Dulce B. Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/982,524

(22) Filed: May 17, 2018

(65) Prior Publication Data
US 2019/0356674 A1 Nov. 21, 2019

(51) Int. Cl.
*H04L 29/06* (2006.01)
*H04L 9/32* (2006.01)
*H04L 9/08* (2006.01)
*H04L 9/06* (2006.01)

(52) U.S. Cl.
CPC ............ *H04L 63/12* (2013.01); *H04L 9/0637* (2013.01); *H04L 9/085* (2013.01); *H04L 9/3263* (2013.01); *H04L 63/102* (2013.01); *H04L 63/105* (2013.01); *H04L 2209/38* (2013.01)

(58) Field of Classification Search
None
See application file for complete search history.

(56) References Cited

U.S. PATENT DOCUMENTS

| 10,505,723 | B1* | 12/2019 | Griffin | ................ | H04L 9/3247 |
| 2016/0330034 | A1 | 11/2016 | Back et al. | | |
| 2017/0109735 | A1 | 4/2017 | Sheng et al. | | |
| 2017/0155515 | A1* | 6/2017 | Androulaki | ............ | G06F 21/64 |
| 2017/0232300 | A1 | 8/2017 | Tran et al. | | |
| 2017/0236123 | A1 | 8/2017 | Ali et al. | | |
| 2017/0250972 | A1* | 8/2017 | Ronda | ....................... | H04L 9/08 |

(Continued)

FOREIGN PATENT DOCUMENTS

| WO | 2017165909 A1 | 10/2017 | | |
| WO | WO-2019142049 A1 * | 7/2019 | ............... | H04L 9/30 |

OTHER PUBLICATIONS

A. Chakravorty, "Ushare: user controlled social media based on blockchain." In Proceedings of the 11th International Conference on Ubiquitous Information Management and Communication (IMCOM '17). ACM, New York, NY, USA, Article 99, 6 pages, 2017.

(Continued)

*Primary Examiner* — Kambiz Zand
*Assistant Examiner* — Arezo Sherkat

(57) ABSTRACT

An example operation may include one or more of receiving a request for performing a post-commit validation of a chain of blocks on a distributed ledger, the chain of blocks being encrypted using an encryption key, requesting cooperation from one or more auditor nodes associated with the distributed ledger, each auditor node comprising a partial secret of a decryption key corresponding to the encryption key, and, in response to receiving partial secrets from a minimum threshold of auditor nodes, recovering the decryption key based on the received partial secrets, decrypting the chain of blocks based on the recovered decryption key, and validating content included within the chain of blocks.

20 Claims, 9 Drawing Sheets

(56) References Cited

U.S. PATENT DOCUMENTS

| | | | |
|---|---|---|---|
| 2017/0317997 A1 | 11/2017 | Smith et al. | |
| 2018/0121909 A1* | 5/2018 | Christidis | G06Q 20/383 |
| 2018/0139186 A1* | 5/2018 | Castagna | H04L 63/0428 |
| 2018/0316492 A1* | 11/2018 | Ramachandran | H04L 9/0637 |
| 2019/0220859 A1* | 7/2019 | Weight | G06Q 20/389 |
| 2019/0305938 A1* | 10/2019 | Sandberg-Maitland | G06F 16/1824 |
| 2019/0311358 A1* | 10/2019 | Bhagavatha | G06Q 20/3829 |
| 2019/0312734 A1* | 10/2019 | Wentz | H04L 9/006 |
| 2019/0317924 A1* | 10/2019 | Alimi | H04L 9/3263 |
| 2019/0333057 A1* | 10/2019 | Miller | G06Q 20/3829 |

OTHER PUBLICATIONS

Bitfury, "On Blockchain Auditability." White paper, version 1.0 (Nov. 14, 2016). http://bitfury.com/content/5-white-papers-research/bitfury_white_paper_on_blockchain_auditability.pdf.

D. Kravitz, "Securing user identity and transactions symbiotically: IoT meets blockchain," 2017 Global Internet of Things Summit (GIoTS), Geneva, 2017, pp. 1-6.

E. Karafiloski, Blockchain solutions for big data challenges: A literature review, IEEE EUROCON 2017—17th nternational Conference on Smart Technologies, Ohrid, 2017, pp. 763-768.

Hyperledger, "Hyperledger Announces Production-Ready Hyperledger Fabric 1.0." https://www.hyperledger.org/announcements/2017/07/11/hyperledger-announces-production-ready-hyperledger-fabric-1-0 [Accessed Dec. 15, 2017].

IBM, IBM Cloud Docs, IBM Blockchain Platform, "Blockchain Basics," https://console.bluemix.net/docs/services/blockchain/ibmblockchain_overview.html#ibmblockchain_overview [Accessed Dec. 15, 2017].

P. Jayachandran, "Making Blockchain Real for Business." PPT slide presentation for Blockchain 2017: Workshop on Blockchain Technologies, Nov. 29-Dec. 1, 2017. Indian Statistical Institute, Kolkata. Venue: NAB-1 Seminar Hall, Ground Floor, Kolmogorov Building.

S. Hashemi, "Decentralized User-Centric Access Control using PubSub over Blockchain." (Submitted on Sep. 29, 2017). https://arxiv.org/abs/1710.00110.

Suzuki "Blockchain as an Audit-Able Communication Channel," 2017 IEEE 41st Annual Computer Software and Applications Conference (COMPSAC), Turin, 2017, pp. 516-522.

* cited by examiner

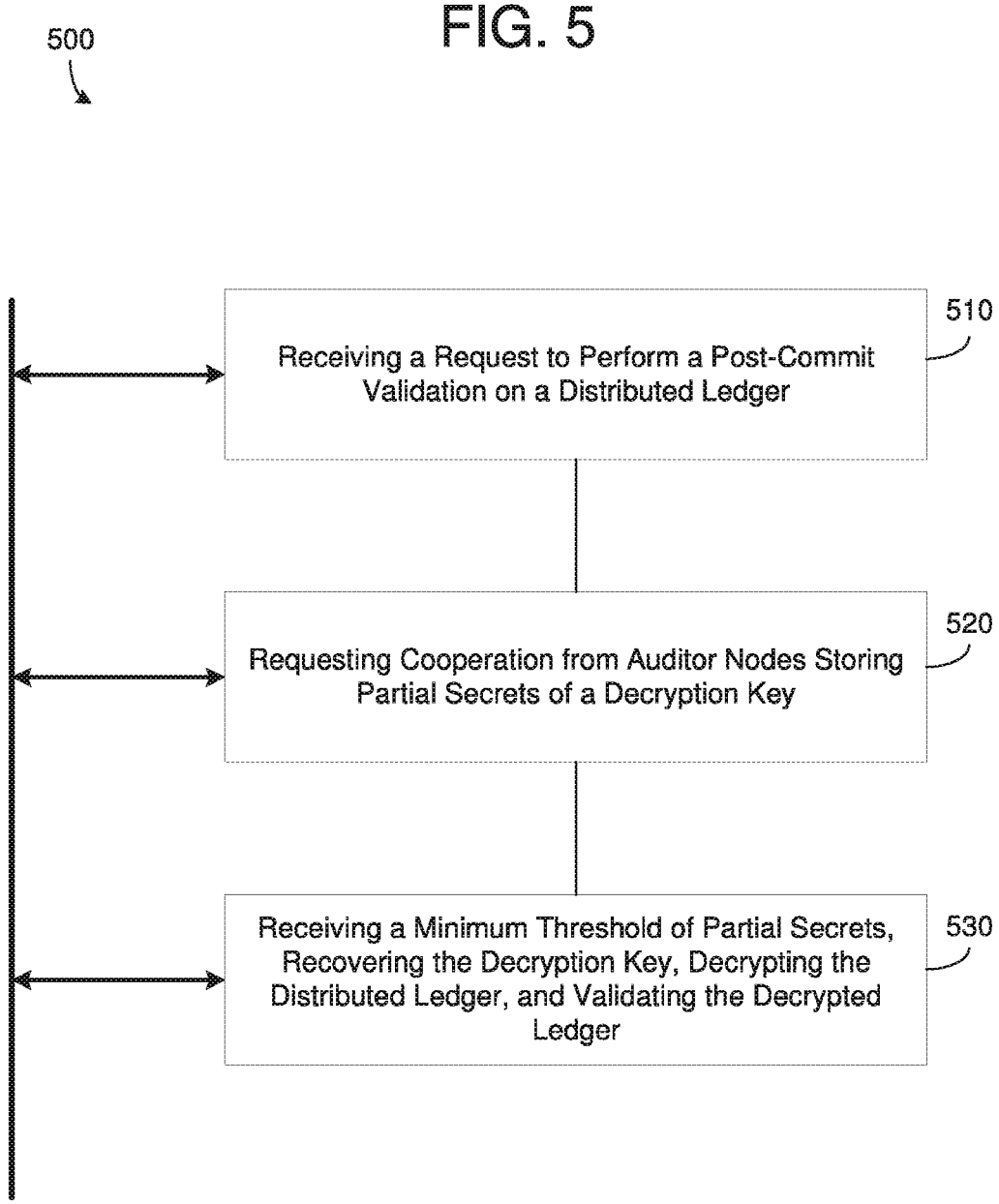

POST-COMMIT VALIDATION IN A DISTRIBUTED LEDGER

TECHNICAL FIELD

This application generally relates to a system and method for validating data, and more particularly, to a network of peer nodes which may implement a customized policy for decrypting and validating a distributed ledger (such as a blockchain).

BACKGROUND

A ledger is commonly defined as an account book of entry in which transactions are recorded and visible to authorized users. A distributed ledger may be distributed (i.e., replicated) in whole or in part across multiple computing systems. One type of distributed ledger is a cryptographic distributed Ledger (CDL) which can have some of the following properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified), and the like. A blockchain is one example of a CDL. While the description and figures herein are described in terms of a blockchain, the instant application applies equally to any CDL.

The cryptographic distributed ledger may link together a continuously growing list of records using cryptographic hashes. Although, primarily used for financial transactions, a blockchain can also (or instead) store information related to goods and services (i.e., products, packages, status, etc.), software, big data, images, documents, and the like. A decentralized scheme within a blockchain network provides authority and trust to a decentralized network of nodes and enables the nodes to continuously and sequentially record their transactions on a public "block", creating a unique "chain" referred to as a blockchain. Cryptography, via hash codes, is used to secure an authentication of a transaction source and provide security without a central intermediary. Furthermore, each block may include a timestamp and a link to a previous block thereby creating a tamper-proof chain of transaction history. Because a blockchain network is a distributed system, before adding a transaction to a blockchain, peers need to reach a consensus status.

In order to ensure that a blockchain (or a node storing the blockchain) has not been corrupted, a blockchain network may perform an auditing of the distributed ledger. The auditing process (or post-commit validation) is a systematic and independent examination of the operation of a state machine system (such as a blockchain node and its version of the distributed ledger) with a goal of determining whether its operation is correct and has continuously been correct. The auditing process can audit the correctness of all transactions or the correctness of an arbitrary subset of transactions within a blockchain. For example, an auditor may perform online verification of incoming blocks of transactions or verify transactions on demand.

Within a blockchain network, a certificate authority (CA) issues and manages certificates needed for trusted digital identities required to implement strong authentication, data encryption and digital signatures. Typically, the certificate authority defines an audit policy and generates membership certificates for auditors in such a way that the credentials, or certificate, of a single auditor are sufficient to decrypt a subset of records on a blockchain. However, a certificate authority is independent from the participants of a blockchain. In other words, the participants that transact and store records on a blockchain have no contribution into how and when their records are audited. Accordingly, what is needed is an improved mechanism for implementing an audit policy.

SUMMARY

One example embodiment may provide a method that includes one or more of receiving a request for performing a post-commit validation of a chain of blocks on a distributed ledger, the chain of blocks being encrypted using an encryption key, requesting cooperation from one or more auditor nodes associated with the distributed ledger, each auditor node comprising a partial secret of a decryption key corresponding to the encryption key, and in response to receiving partial secrets from a minimum threshold of auditor nodes, recovering the decryption key based on the received partial secrets, decrypting the chain of blocks based on the recovered decryption key, and validating content included within the chain of blocks.

Another example embodiment may provide a system that includes one or more of a network interface configured to receive a request for performing a post-commit validation of a chain of blocks on a distributed ledger, the chain of blocks encrypted using an encryption key, and a processor configured to one or more of control the network interface to request cooperation from one or more auditor nodes associated with the distributed ledger, where each auditor node comprises a partial secret of a decryption key that corresponds to the encryption key, and, in response to receipt of partial secrets from a minimum threshold of auditor nodes, recover the decryption key based on the received partial secrets, decrypt the chain of blocks based on the recovered decryption key, and validate the chain of blocks.

A further example embodiment may provide a non-transitory computer readable medium comprising instructions, that when read by a processor, cause the processor to perform one or more of receiving a request to for performing a post-commit validation of a chain of blocks on a distributed ledger, the chain of blocks being encrypted using an encryption key, requesting cooperation from one or more auditor nodes associated with the distributed ledger, each auditor node comprising a partial secret of a decryption key corresponding to the encryption key, and in response to receiving partial secrets from a minimum threshold of auditor nodes, recovering the decryption key based on the received partial secrets, decrypting the chain of blocks based on the recovered decryption key, and validating content included within the chain of blocks.

BRIEF DESCRIPTION OF THE DRAWINGS

FIG. 5 is a diagram illustrating a method for decrypting a ledger based on a minimum cooperation threshold, according to example embodiments.

DETAILED DESCRIPTION

Figure 1:
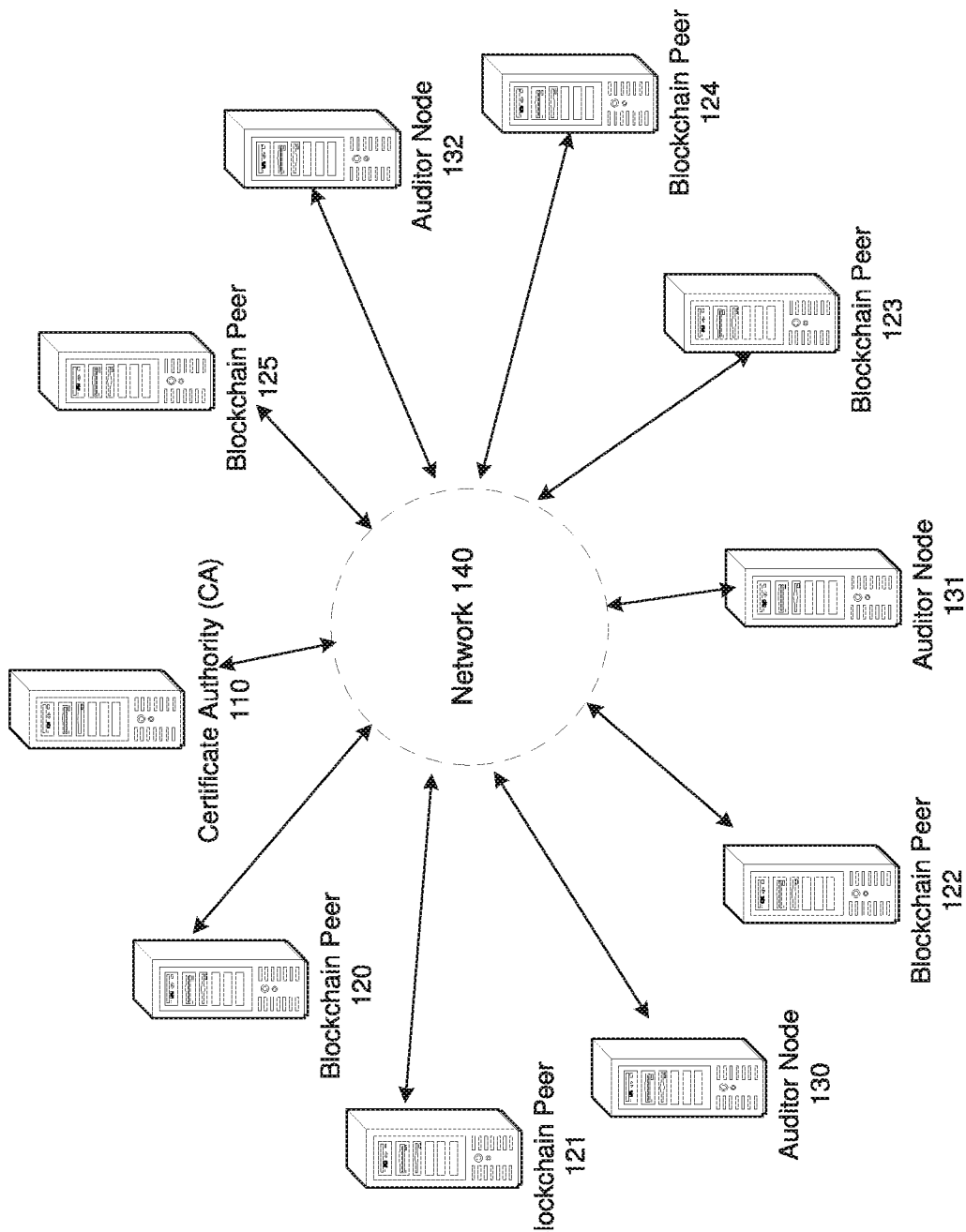
FIG. 1 is a diagram illustrating a blockchain network implementing peer auditability, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The example embodiments are directed to methods, devices, networks and/or systems, which support a blockchain system that implements peer auditability for decrypting and validating a distributed ledger. The audit process can be used to identify whether a blockchain node has been corrupted or is acting irregularly. Some of the benefits of such a system include the ability for blockchain peers to specify the minimal number of auditors that need to cooperate before the blockchain ledger can be decrypted and thus interpreted by them. For example, the blockchain peers could define that at least N auditors have to agree. This minimum threshold prevents unauthorized interpretation of the transactions by a single auditor.

The minimum threshold may be enforced by cryptography, which may rely on a truth agreement for an audit to take place. Based on the agreement, custom logic can be generated to interpret the transactions settled in the ledger. That is, the example embodiments are not limited to the functionality after the auditors are able to decrypt the ledger but prevents decryption of the distributed ledger from happening until the specified conditions are fulfilled. For example, relying on a threshold cryptosystem, a certificate authority (CA) is able to provide certificates for auditor nodes in such a way that no single auditor is able to decrypt the ledger (unless the auditor policy specify just one auditor is needed to cooperate). This minimum threshold requires that a minimum number of auditors share their knowledge with the others, in order to recover a decryption key to finally decrypt the ledger.

One of the technical improvements of the example embodiments is the application of threshold cryptosystem to a permissioned blockchain platform in order to ensure the blockchain ledger can be decrypted by members with audit responsibilities only when pre-defined and/or customized conditions have been meet. The platform enables peer auditability conditions to be dynamically implemented which is a capability not provided for in related blockchains. For example, the network may enhance the operation of the certificate authority that the blockchain platform relies on and the protocol employed in the blockchain platform such that the auditors can collaborate/cooperate to recover the decryption key when an audit is requested/needed.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, cryptography and security, an immutable ledger, privacy, smart contracts, decentralization, consensus, endorsement, accessibility, and the like, which are further described herein. According to various aspects, the peer auditability is implemented as a result of the privacy of information settled on the ledger which is created by cryptography of blocks storing the information on the ledger, even to auditor nodes. Accordingly, a minimum number of auditor nodes must cooperate before any of the auditors nodes is able to decrypt the ledger. Furthermore, the decentralized nature of the blockchain system and the independence between peer nodes and auditor nodes enables the ledger to be self-regulated in a decentralized manner and without a centralized authority.

The example embodiments are not applicable to a traditional database because a traditional database does not provide for independent auditing nor does a traditional database have permissioned roles where certain nodes have access to certain parts of the ledger without access to all of the ledger. The example embodiments occur in a context in which several organizations transact in a shared ledger, in which not all the members have access to all transactions, and auditory capabilities by members not able to decrypt the transactions is involved. This context is specific to permissioned blockchain platforms. Accordingly, the example embodiments provide for a specific solution that cannot be implemented via a traditional database.

Another aspect of the example embodiments is that auditor nodes, while receiving blocks of transactions, may verify the encrypted transactions are signed by a private key associated to the distributed ledger. This means that the auditor node may perform a minimal verification of auditability before storing the block of transactions to ensure they are be able to decrypt the transaction when an auditory is done. In addition, endorsing peers have to encrypt the transaction and sign a digest of it with the private key of the ledger. The encryption can be made with the public key of the ledger (initially provided by a certificate authority) or using a symmetric key agreed by all the blockchain peers (including the auditor nodes) that are involved in the ledger (this process is commonly known as key agreement). This way, the certificate authority is not able to interpret the content of the transactions.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser, and broadcasts transaction-proposals to an ordering service (i.e., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A distributed ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Blockchain architecture solves problems with blame ascription, retrospective audits and interaction with clients by grouping transactions into blocks. Consensus decisions are made on the block level instead of the transaction level. Each block may include two parts including a relatively small block header, the size of which does not depend on the number of transactions in the block, and transactions. Transactions are committed to the block header, usually as a root of a Merkle tree. A block header can also include a reference to the previous block (a cryptographic hash of its header), a block timestamp, a commitment to the state of the system, data allowing to independently verify the consensus, and the like. Because of the block structure, a synchronizing node can reliably download blocks from any node regardless of whether it participates in consensus. Thus, the network of auditing nodes could provide a blockchain content delivery network (CDN) which may distribute the load more evenly among nodes replicating the blockchain in whole.

An auditor node may audit the distributed ledger or a portion of the distributed ledger for each node. The audit process is a process of validating transactions stored within blocks on the distributed ledger after the transactions have been committed to the ledger by blockchain peer nodes. Therefore, the audit may be referred to as a post-commit validation process in which an independent auditor node may validate transactions previously stored to the distributed ledger by other blockchain peer nodes. An auditor node is independent from a peer node in that the auditor node does not have the ability to create or add new transactions to the ledger but rather is designed and permissioned to decrypt and audit transactions stored on the distributed ledger by peer nodes. In a permissioned blockchain, a peer node is given permissions to access some transactions, but often, not all transactions. Therefore, the copy of the distributed ledger stored by the peer node may be corrupted while the peer node is unaware or unable to verify the corruption. Therefore, the auditor node may be crucial in verifying that all transactions (even those that are not accessible to a peer node) are valid to ensure credibility and prevent corruption on the ledger.

The instant application in one embodiment relates to a system and method for validating data, and in another embodiment relates to a system and method for validating data, and more particularly, to a network of peer nodes which may implement a customized policy for decrypting and validating a distributed ledger (such as a blockchain).

FIG. 1 illustrates a blockchain network 100 implementing peer auditability, according to example embodiments. Referring to FIG. 1, the blockchain network 100 includes a certificate authority 110 managing certificates, permissions, and roles among nodes within the blockchain network 100. In this example, the blockchain network 100 includes a plurality of peer nodes 120-125 and a plurality of auditor nodes 130-132, which may be connected to each other and the certificate authority 110 via a network 140. The auditor nodes 130-132 may operate independently from the peer nodes 120-125 and may be used to audit distributed ledgers (or replicas of the distributed ledger) stored at each of the peer nodes 120-125. Each peer node may store more than one ledger. Auditor nodes 130-132 are blockchain peers that are part of the blockchain network 100, receive certificates from the certificate authority 110, and receive blocks while they are generated by an ordering service (not shown) of the blockchain network 100 which may be another node or nodes in the network 100.

According to various embodiments, before an auditor node (e.g., 130-132) may audit a distributed ledger stored by a peer node (e.g., peer nodes 120-125), a minimum number of auditor nodes 130-132 must agree to perform the audit. The ledger to be audited can be encrypted via a public encryption key accessible to nodes of the blockchain. In some embodiments, each of the auditor nodes 130-132 may be assigned a partial secret of a decryption key for decrypting the encrypted blockchain ledger stored by the peer nodes 120-125. Here, the partial secret may not recover the decryption key on its own. Instead, the partial secret may need to be combined with one or more other partial secrets (i.e., a minimum threshold) before the decryption key can be recovered from the combination. Therefore, multiple independent auditor nodes 130-132 may have to agree to decrypt the ledger before the audit process can take place.

The minimum requirement of auditor nodes 130-132 needed to decrypt a distributed ledger may be agreed on in advance by the plurality of peer nodes 120-125 which participate in storing and transacting records on the distributed ledger. In other words, the peer nodes 120-125 may implement an audit policy requiring a minimum number of audit nodes 130-132 (also referred to as validator nodes) to agree before any of the peer nodes 120-125 can be audited. The peer audit policy may be transmitted to the certificate authority 110 by one of the peer nodes 120-125 during a request to initiate the distributed ledger. In some embodiments, the certificate authority 110 may insert the peer audit policy into the blockchain itself, such as within a genesis block of the chain.

The peer nodes 120-125 may be associated with different participants or different organizations. By creating an audit policy that is agreed on by a consensus of the participants, the participants can control how and when their records are audited. This is very different from a traditional blockchain where a single auditor node is usually enough to audit any of the blockchain peers.

Figure 2A:
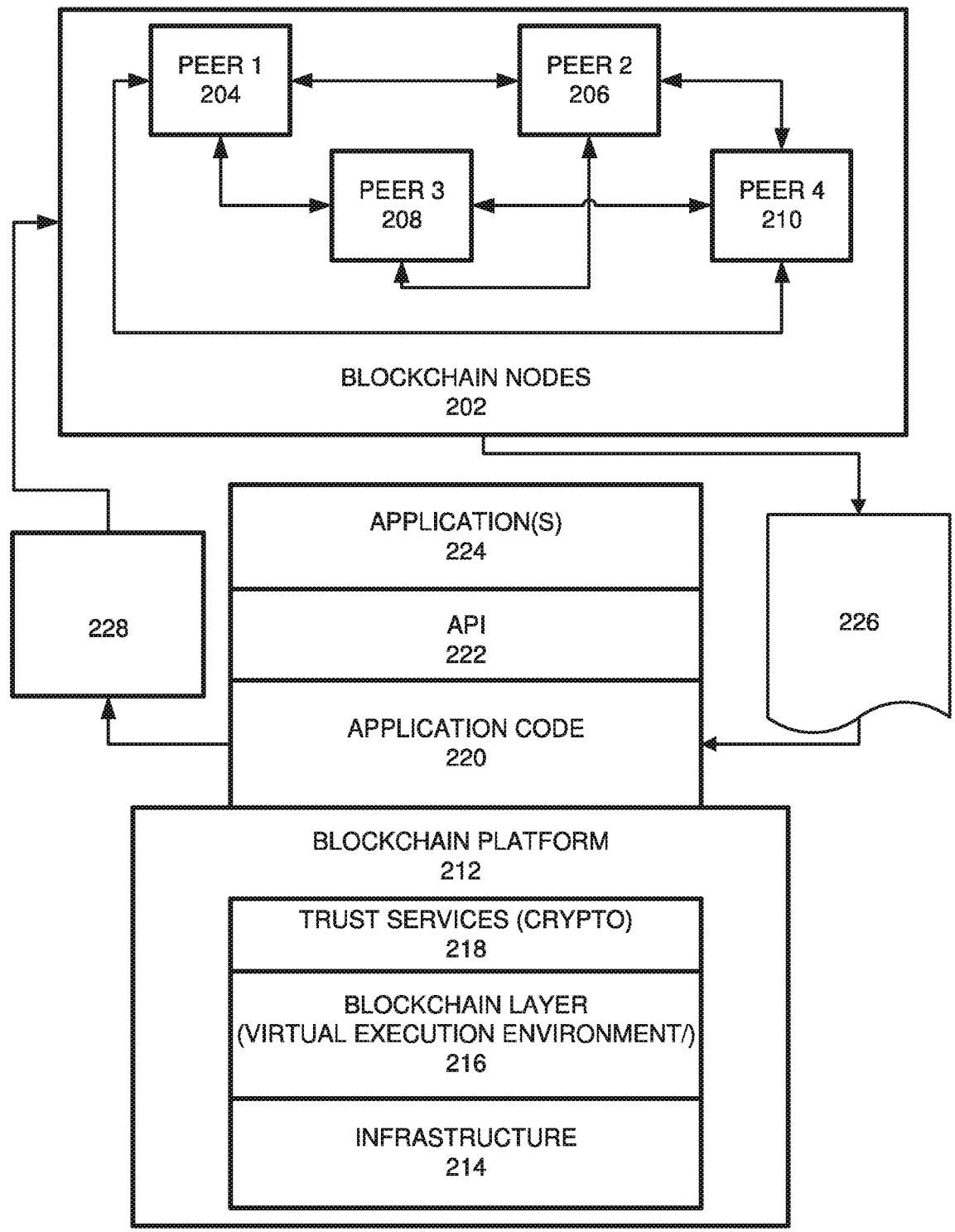
FIG. 2A is a diagram illustrating a peer node blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation. In this example, validation refers to the validation of a transaction before being committed. Meanwhile, an audit is performed on the validations and can be used to audit each validated individual transaction after its committed into the ledger by committer peers. One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, asset information 226 may be processed by one or more processing entities (e.g., virtual machines) included in the blockchain layer 216. The processing result 228 may include changes to the asset value key/pairs. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and audited by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details, which may be provided to one or more of the nodes 204-210.

Figure 2B:
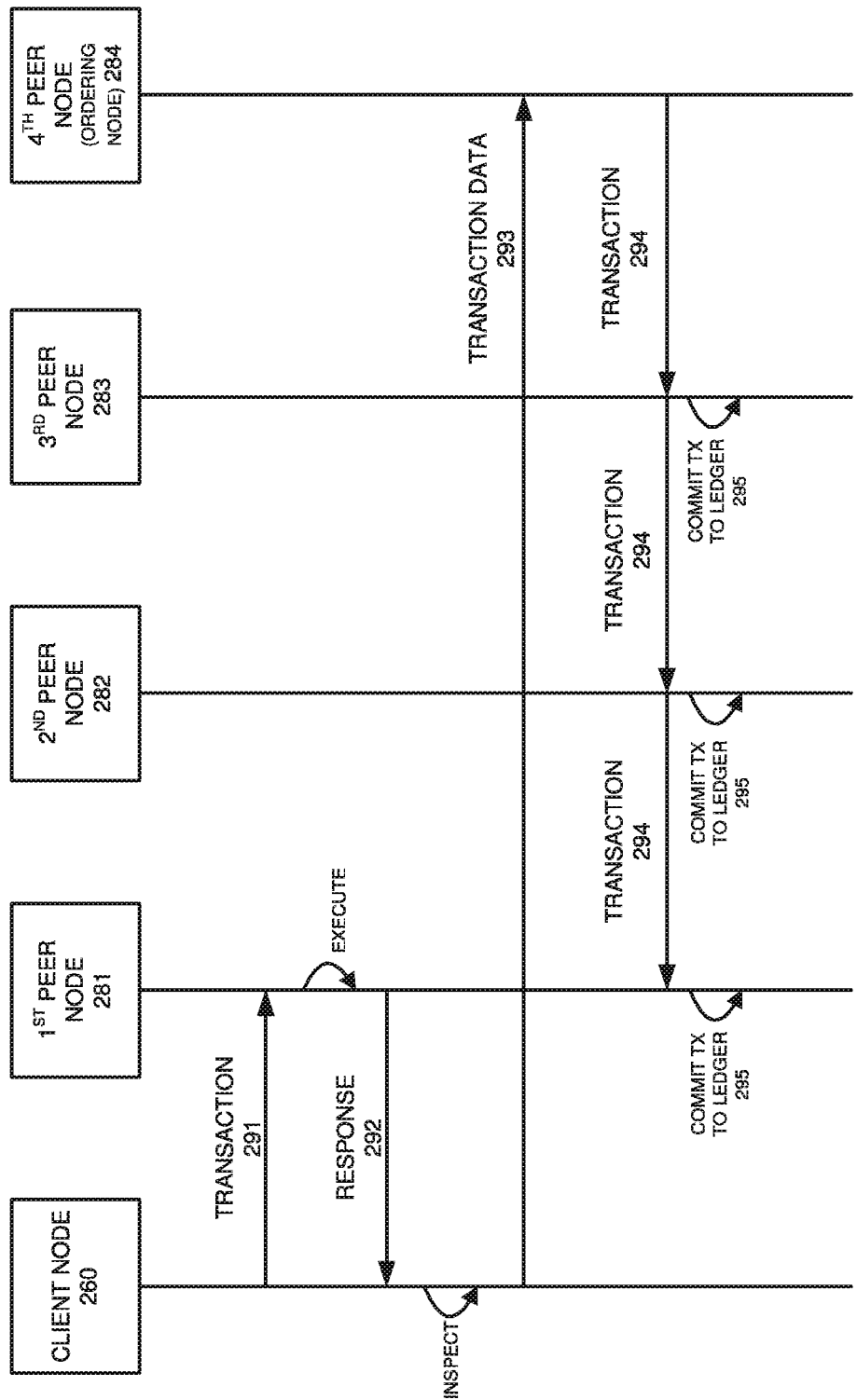
FIG. 2B is a diagram illustrating a peer node communication process, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
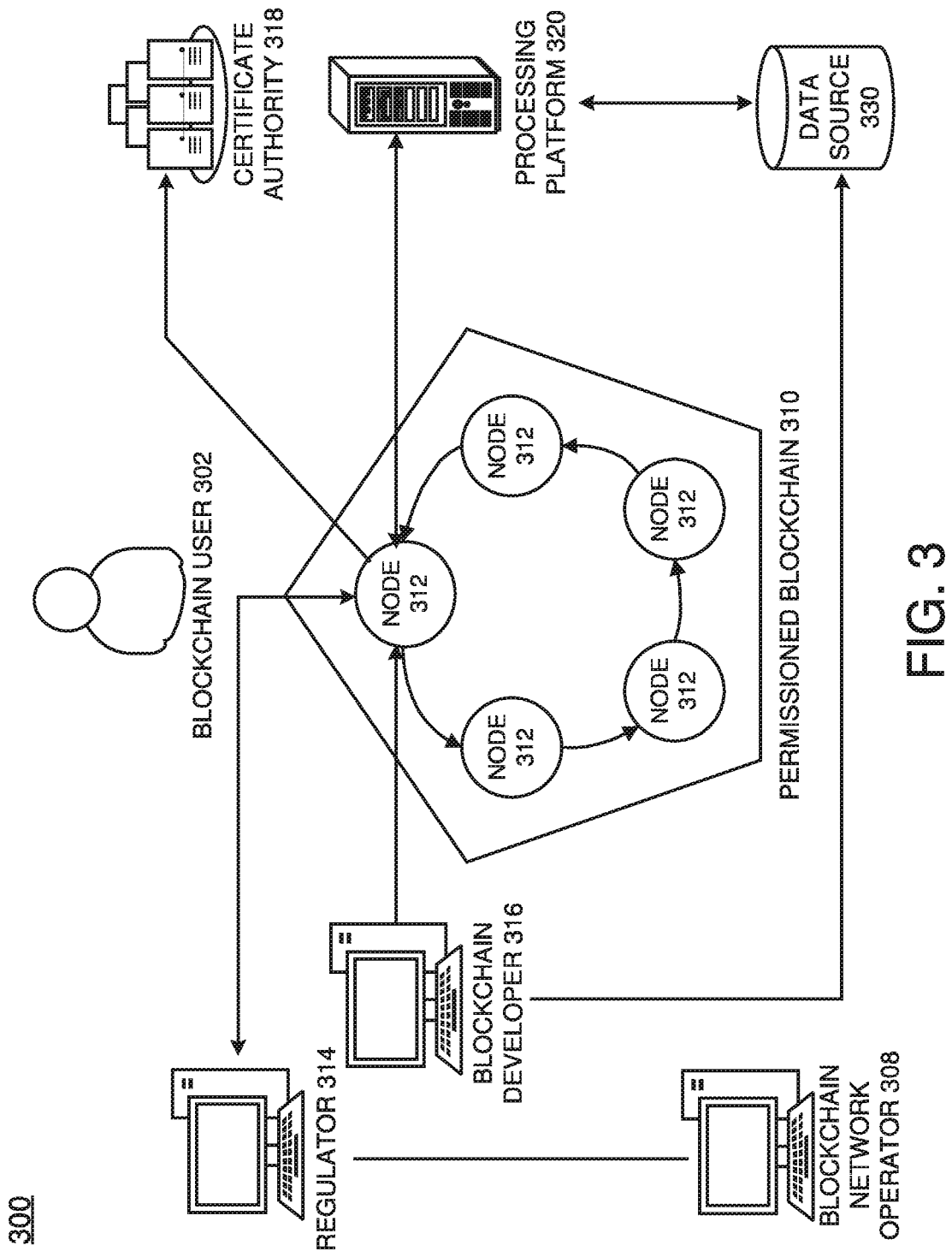
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. The transaction can be a deploy, an invoke, a query, or the like, and may be issued through a client-side application leveraging an SDK, directly through a REST API, or the like. A blockchain network operator system 308 may manage nodes 312 and also manage member permissions, such as enrolling a regulator system as an auditor node 314 and the blockchain user 302 as a client. For example, the auditor node 314 may be restricted to querying the ledger to validate the content of the blockchain whereas the blockchain user 302 may be authorized to deploy, invoke, and query certain types of chaincode via a peer node 312, however, embodiments are not limited thereto.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. Furthermore, the auditor node 314 may receive an audit policy and a corresponding audit certificate including a partial secret of a decryption key from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
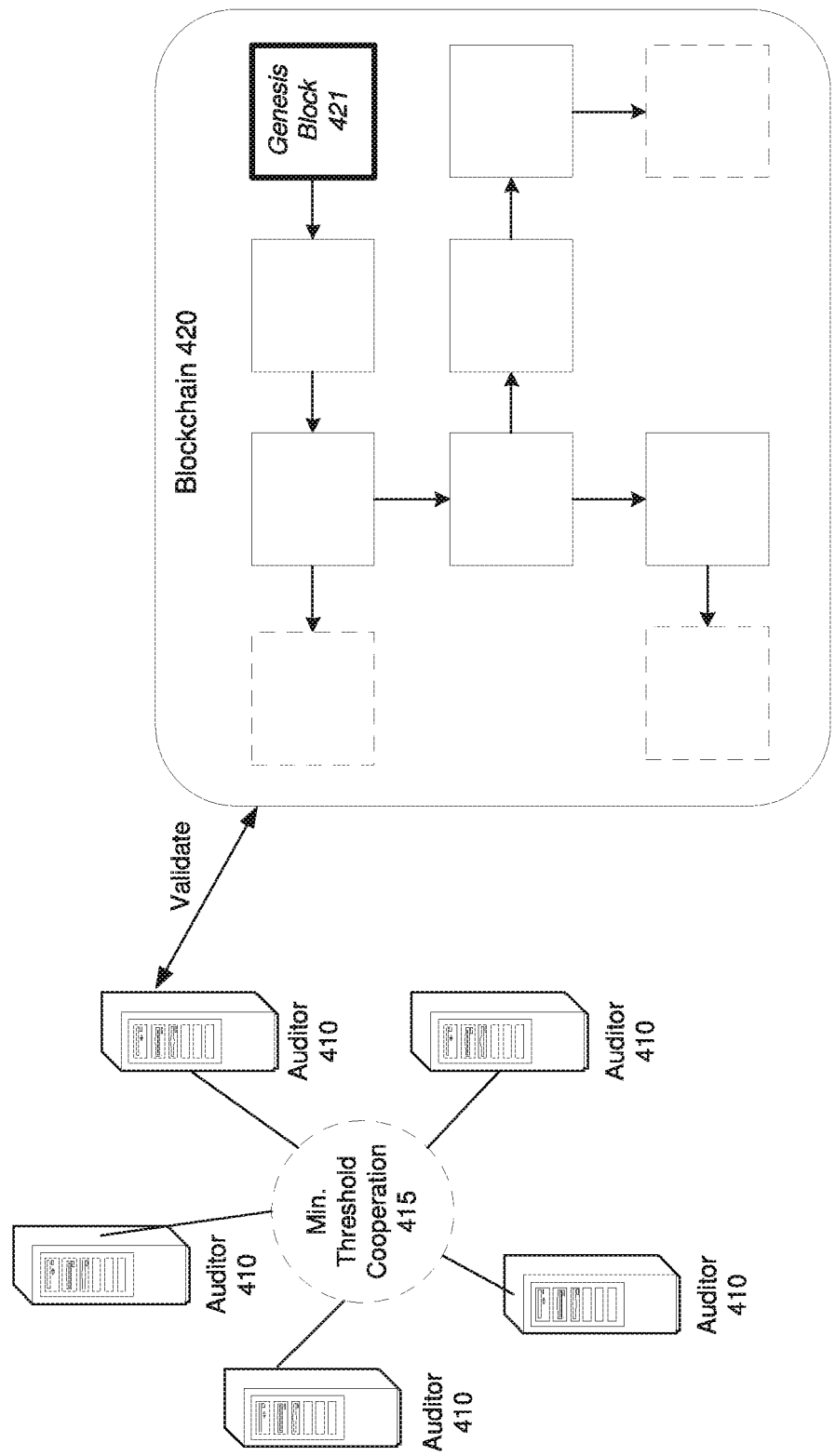
FIG. 4 is a diagram illustrating a process of cooperation among auditor nodes for performing a post-commit validation of a blockchain, according to example embodiments.

FIG. 4 illustrates a process 400 of cooperation among auditor nodes for performing an audit of a blockchain, according to example embodiments. In the example of FIG. 4, a plurality of auditor nodes 410 must achieve a minimum threshold of cooperation 415 before any of the auditor nodes 410 can audit a distributed ledger (blockchain 420). Not shown in FIG. 4 is a group of peer nodes which may be members of the blockchain 420 and which are capable of creating and storing records via the blocks of the blockchain 420.

One of the main strengths of permissioned blockchain systems resides on its audit capabilities. A common approach to enable auditors to decrypt a subset of the records consist of relying on a certificate authority generating membership certificates in such a way that only the credentials of a single auditor are required and sufficient to decrypt a subset of the records. The example embodiments provide a solution in which the auditors 410 have to agree (e.g., minimum threshold agreement 415) before being able to audit records on the blockchain 420. Furthermore, the example embodiments implement peer auditability, in the sense that entities that participate and register their records into the blockchain 420 are able to decide by themselves as a group if an audit process has to be done to their shared records.

A certificate authority (CA) service may provide unique membership certificates for the participants of the blockchain network including the peer nodes (not shown) and the auditor nodes 410. As part of the solution, the CA service may be enhanced in such a way participants of the blockchain 420 may define audit policies for their records. As described herein, an audit policy is used to specify the conditions in which the records of a ledger can be decrypted. For example, the audit policy might specify a number/amount of members (of an also specified subset of members) that are required to agree before an audit process can take place.

Multiple ledgers may be maintained within blockchain 420 or which include blockchain 420 Each ledger may be implemented with its own smart contracts and each smart contract with its own endorser policy. The endorser policy of a smart contract may be used to determine if a transaction is valid or not. Furthermore, endorser policies may restrict which members are able to interpret incoming transactions. All non-auditor members of a ledger may be able to validate all the transactions or equivalently, may be able to maintain the state of the smart contracts. On the other hand, the auditors 410 of the blockchain 420 may only be able to validate or otherwise audit the auditability of transactions and to maintain a copy of them. Non-members of the blockchain 420 are not able to interpret neither validate transactions.

In some embodiments, a subset of members of the blockchain 420 may be able to create a shared ledger in such a way that only members of such subset are able to audit transactions and thus, to maintain a state based on them. In this example, a disjoint subset (auditors 410) is able to decrypt the registers of that blockchain 420 after a certain number of them agree (the exact number may be specified in the audit policy of the blockchain 420).

To initially generate the peer auditability policy on the ledger, a request for a ledger certificate may be sent by a peer node (not shown) of the blockchain 420 to a CA service (not shown). The request may include a set of members of the network (their membership certificate public key), an audit policy specifying the set of auditors 410 (their membership certificate public key), the number of them required to agree in order an audit process can take place, and the signature of the digest of the member set and audit policy by each member of the set of members. Those signing members may be able to validate transactions and thus, to maintain the state of the smart-contracts on the new ledger (blockchain 420). A member who signed can not be part of the auditors 410 (it could be possible to require auditor nodes to sign the request as well, but what shouldn't happen is to associate a same public key to both, as endorsing or committer as auditor node as well), as it will be already provided with the information required to decrypt the records. The request may sent to the CA service, and if it's valid, a certificate is generated by the CA service and provided to the blockchain 420 and may be stored in a genesis block 421 of the blockchain 420. The certificate within the genesis block 421 may contain one or more of a public key, member list, audit policy, the private key associated encrypted with a symmetric key, secret shares for each auditor 410 encrypted with each auditor's public key (threshold cryptosystem), symmetric key used to encrypt the private key encrypted with each member's public key, and the like.

In the example of FIG. 4, the auditors 410 may receive a secret that requires cooperation with other auditors 410 in order to recover a decryption key corresponding to the encryption key used to encrypt the private key of the ledger. In some embodiments, different implementations might be provided for the method. For instance, different encryption methods could be used, the key material could be provided by different means rather than in a single ledger certificate, and the like.

To audit a transaction, an auditor 410 may receive the transaction such as transactions associated in the blockchain 420 which the auditor 410 is associated with. Once one of the transactions is received, the auditor 410 may verify the content is encrypted using the public key of the ledger (e.g., the public key included in the ledger certificate generated by the CA service.) If the transaction was encrypted using that public key, the auditor 410 can be sure that cooperating with other auditors will be able to decrypt its content.

In some embodiments, the auditors may perform a new role to the existent ones of a blockchain (Endorser, Committer and Orderer). In a similar way a committers validates processed transactions after they are ordered, an auditor may audit processed transactions for auditability before maintaining a local copy, if a record is not auditable the situation may be widespread on the blockchain network and an audit process might be agreed for that ledger.

To further enhance security, all involved participants of a ledger (those able to validate transactions and the auditors able to audit the ledger storing transactions) can generate a shared secret (i.e. a public/private key pair or a symmetric key) not known by the CA service. Incoming transactions may then be encrypted with the public key of the ledger (the public key generated by the members of the ledger, and not the key provided by the CA service). Here, members of the ledger may use the decryption key to be able to interpret the incoming transaction. The digest of the encrypted transactions may be signed using the original private key of the ledger. That way, auditor nodes are able to easily verify the auditability of the transactions without the need of decrypting them. In this case, the CA service won't have enough information to decrypt the records. Furthermore, new members may be incorporated to an existent ledger by sharing with it the secret key known by non-auditors (a new version of the certificate might be generated for a proper validation). Further changes may be supported as well, creating new versions and/or using a cryptographic schema supporting it.

FIG. 5 illustrates a method 500 for decrypting a ledger based on a minimum cooperation threshold, according to example embodiments. For example, the method 500 may be performed by an auditor node within a blockchain network. Referring to FIG. 5, in 510, the method may include receiving a request to audit a chain of blocks on a distributed ledger, the chain of blocks being encrypted using an encryption key. For example, the request may be received from a client and may include some evidence that the distributed ledger may have been corrupted or is otherwise incorrect, however, embodiments are not limited thereto. It should be appreciated that any condition may cause a request for an audit such as a periodic frequency, a random request, a specified occurrence, or the like.

In 520, the method may include requesting cooperation from one or more auditor nodes associated with the distributed ledger. In this example, each auditor node may include a partial secret of a decryption key corresponding to the encryption key. The request for cooperation may include a request to share partial secrets to conduct an audit. The individual partial secrets may not be able to recover the decryption key on their own. Accordingly, an audit node may transmit a request in response to receiving a request from a client node, a peer node, an occurrence at the audit node, the like.

In response to receiving partial secrets from a minimum threshold of auditor nodes, in 530, the method may include recovering the decryption key based on the received partial secrets, decrypting the chain of blocks based on the recovered decryption key, and validating content included within the chain of blocks. For example, N auditor nodes may be associated with the distributed ledger and partial secrets from a minimum of m of the auditor nodes are needed to recover the decryption key, where m<N. In this example, the chain of blocks may be shared among a plurality of entities of a permissioned blockchain, and each entity may have access to a unique portion of the chain of blocks but not the entire chain of blocks. Here, the auditing may include validating transactions within the chain of blocks of all entities among the plurality of entities of the permissioned blockchain.

In some embodiments, the method may include transmitting a custom audit policy identifying the minimum threshold of auditor nodes to a certificate authority of the distributed ledger. In this example, the transmitting may further include transmitting a request for initiating the distributed ledger including the custom audit policy. Here, the audit policy may be pre-defined by a group of peer nodes within the blockchain network. After the validation process is performed, the method may further include transmitting a result of the validation of the chain of blocks to one or more blockchain peer nodes which are associated with the distributed ledger. In some embodiments, the method may further include identifying the minimum threshold of auditor nodes from a genesis block within the chain of blocks on the distributed ledger.

Figure 6A:
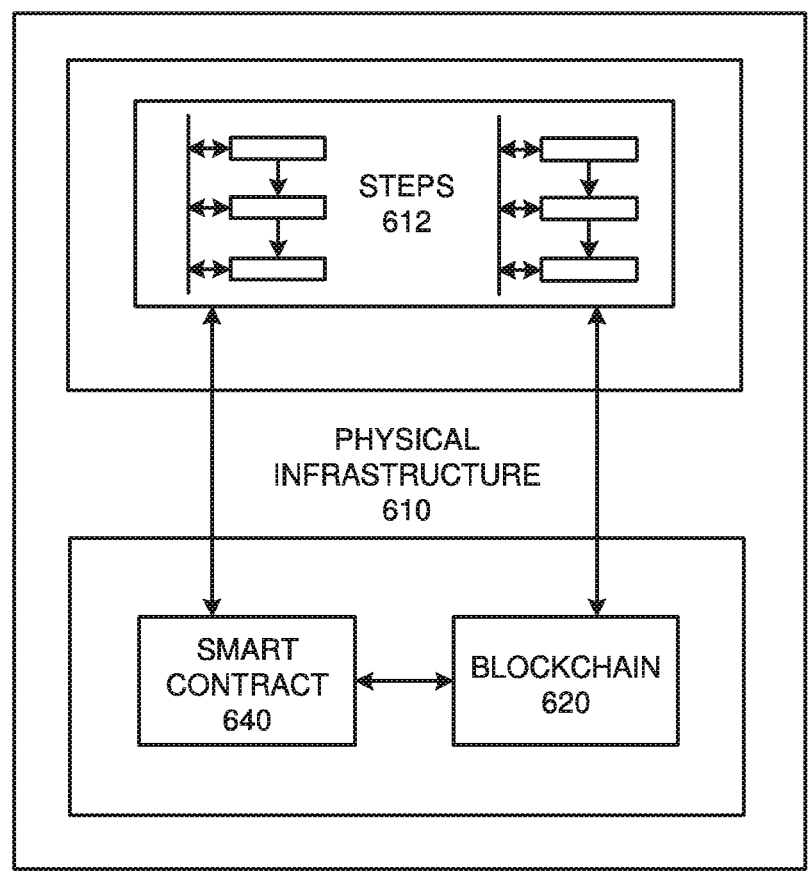
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute based on the peer-defined audit policy described according to various embodiment. The steps/operations 612 may include invoking chaincode and writing transactions to a distributed ledger. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
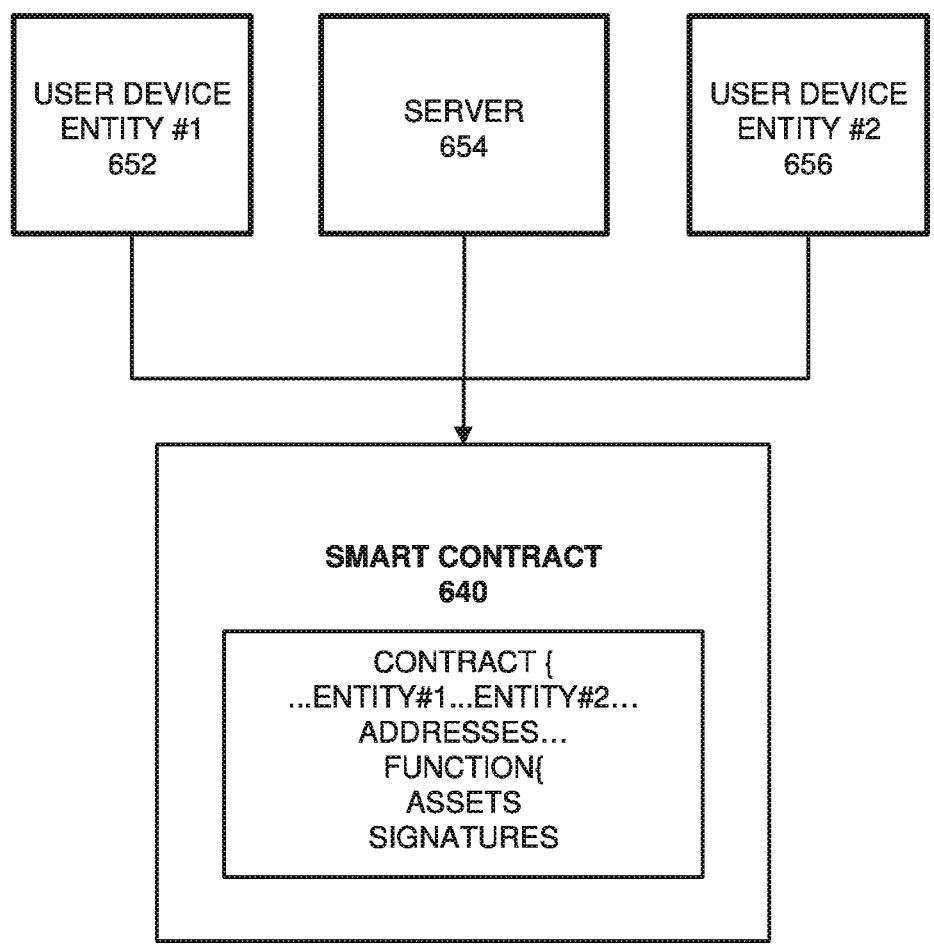
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
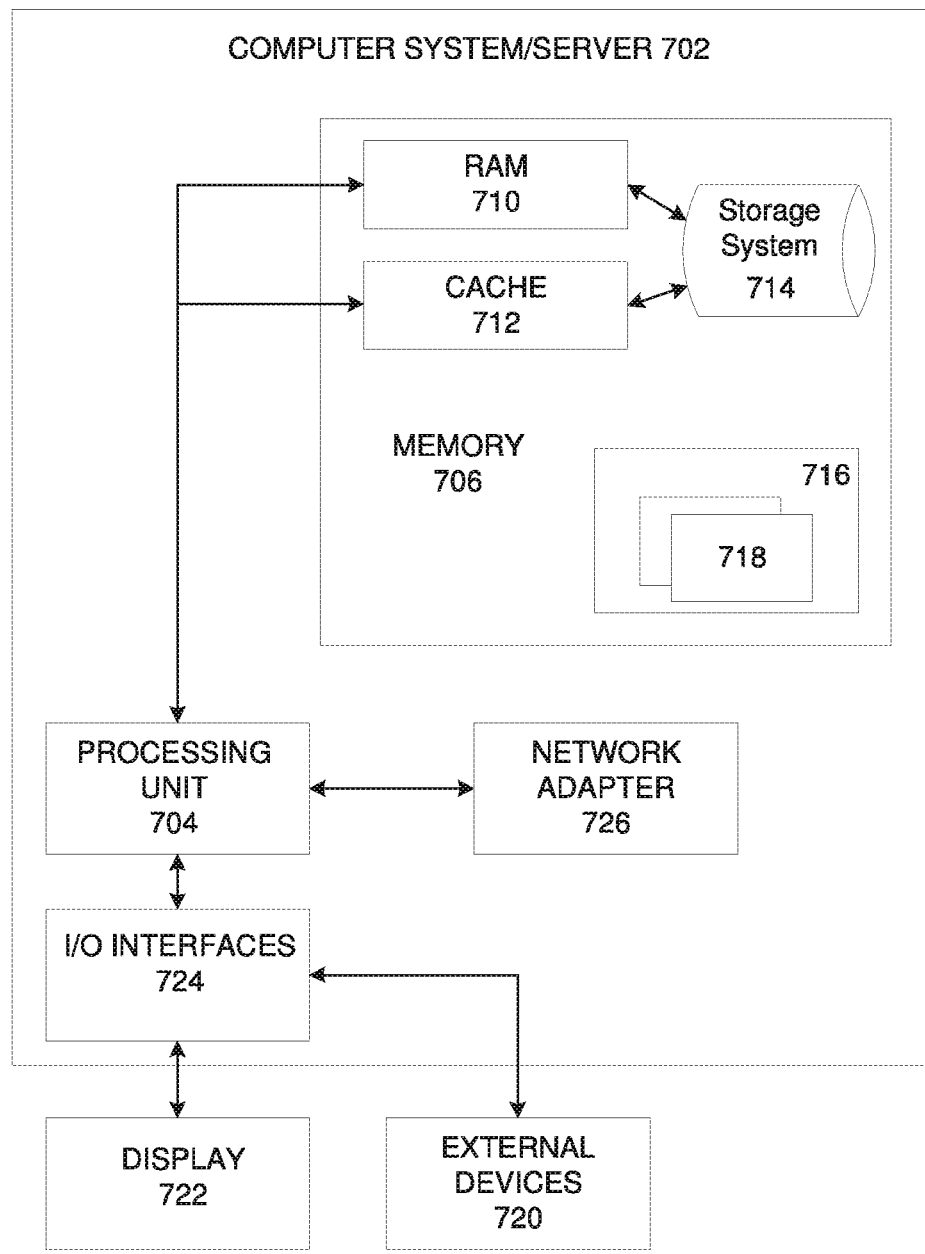
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to one or more embodiments, the network interface 726 may receive a request to audit (e.g., perform a post-commit validation of) a chain of blocks on a distributed ledger where the chain of blocks are encrypted using an encryption key. The processor 704 may control the network interface 726 to request cooperation from one or more auditor nodes associated with the distributed ledger. For example, each auditor node may include a partial secret of a decryption key that corresponds to the encryption key. In response to receipt of partial secrets from a minimum threshold of auditor nodes, the processor 726 may also recover the decryption key based on the received partial secrets, decrypt the chain of blocks based on the recovered decryption key, and audit the chain of blocks.

In some embodiments, the processor 726 may transmit a result of the validation of the chain of blocks to one or more blockchain peer nodes associated with the distributed ledger. In some embodiments, the processor 726 may identify the minimum threshold of auditor nodes from a genesis block within the chain of blocks on the distributed ledger.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system, comprising:
   a network interface configured to receive a request for a post-commit validation of a chain of blocks on a distributed ledger which are encrypted with an encryption key; and
   a hardware processor configured to
   identify a predetermined peer audit policy that is agreed to by a consensus of blockchain peers of the distributed ledger and that defines a minimum threshold of auditor nodes that must agree to perform an audit,
   control the network interface to request cooperation from one or more auditor nodes associated with the distributed ledger, where each auditor node comprises a partial secret of a decryption key that corresponds to the encryption key, and
   in response to receipt of partial secrets from the minimum threshold of auditor nodes defined by the predetermined peer audit policy, recover the decryption key based on the received partial secrets, decrypt the chain of blocks based on the recovered decryption key, and validate the chain of blocks.

2. The computing system of claim 1, wherein the hardware processor is further configured to transmit a result of the validation of the chain of blocks to one or more blockchain peer nodes associated with the distributed ledger.

3. The computing system of claim 1, wherein the hardware processor is further configured to identify the predetermined peer audit policy including the minimum threshold of auditor nodes from a genesis block within the chain of blocks on the distributed ledger.

4. The computing system of claim 1, wherein N auditor nodes are associated with the distributed ledger and partial secrets from a minimum of m of the auditor nodes are required by the predetermined peer audit policy to recover the decryption key, where m<N.

5. The computing system of claim 1, wherein the chain of blocks is shared among a plurality of entities of a permissioned blockchain, and each entity has access to a unique portion of the chain of blocks but not the entire chain of blocks.

6. The computing system of claim 5, wherein the hardware processor is configured to validate transactions within the chain of blocks of all entities among the plurality of entities of the permissioned blockchain.

7. The computing system of claim 1, wherein the hardware processor is further configured to transmit the predetermined peer audit policy that identifies the minimum threshold of auditor nodes to a certificate authority of the distributed ledger.

8. The computing system of claim 7, wherein the hardware processor is further configured to transmit a request to initiate the distributed ledger to the certificate authority which includes the audit policy.

9. A method, comprising:
receiving a request for performing a post-commit validation of a chain of blocks on a distributed ledger, the chain of blocks being encrypted using an encryption key;
identifying a predetermined peer audit policy that is agreed to by a consensus of blockchain peers of the distributed ledger and that defines a minimum threshold of auditor nodes that must agree to perform an audit;
requesting cooperation from one or more auditor nodes associated with the distributed ledger, each auditor node comprising a partial secret of a decryption key corresponding to the encryption key; and
in response to receiving partial secrets from the minimum threshold of auditor nodes defined by the predetermined peer audit policy, recovering the decryption key based on the received partial secrets, decrypting the chain of blocks based on the recovered decryption key, and validating content included within the chain of blocks.

10. The method of claim 9, further comprising transmitting a result of the validation of the chain of blocks to one or more blockchain peer nodes which are associated with the distributed ledger.

11. The method of claim 9, further comprising identifying the predetermined peer audit policy including the minimum threshold of auditor nodes from a genesis block within the chain of blocks on the distributed ledger.

12. The method of claim 9, wherein N auditor nodes are associated with the distributed ledger and partial secrets from a minimum of m of the auditor nodes are required by the predetermined peer audit policy to recover the decryption key, where m<N.

13. The method of claim 9, wherein the chain of blocks is shared among a plurality of entities of a permissioned blockchain, and each entity has access to a unique portion of the chain of blocks but not the entire chain of blocks.

14. The method of claim 13, wherein the validating comprises validating transactions within the chain of blocks of all entities among the plurality of entities of the permissioned blockchain.

15. The method of claim 9, further comprising transmitting the predetermined peer audit policy identifying the minimum threshold of auditor nodes to a certificate authority of the distributed ledger.

16. The method of claim 15, wherein the transmitting further comprises transmitting a request for initiating the distributed ledger including the predetermined peer audit policy.

17. A non-transitory computer readable medium comprising instructions, that when read by a processor, cause the processor to perform:
receiving a request for performing a post-commit validation of a chain of blocks on a distributed ledger, the chain of blocks being encrypted using an encryption key;
identifying a predetermined peer audit policy that is agreed to by a consensus of blockchain peers of the distributed ledger and that defines a minimum threshold of auditor nodes that must agree to perform an audit;
requesting cooperation from one or more auditor nodes associated with the distributed ledger, each auditor node comprising a partial secret of a decryption key corresponding to the encryption key; and
in response to receiving partial secrets from the minimum threshold of auditor nodes defined by the predetermined peer audit policy, recovering the decryption key based on the received partial secrets, decrypting the chain of blocks based on the recovered decryption key, and validating content included within the chain of blocks.

18. The non-transitory computer readable medium of claim 17, wherein the method further comprises transmitting a result of the validation of the chain of blocks to one or more blockchain peer nodes which are associated with the distributed ledger.

19. The non-transitory computer readable medium of claim 17, wherein the method further comprises identifying the predetermined peer audit policy including the minimum threshold of auditor nodes from a genesis block within the chain of blocks on the distributed ledger.

20. The non-transitory computer readable medium of claim 17, wherein N auditor nodes are associated with the distributed ledger and partial secrets from a minimum of m of the auditor nodes are required by the predetermined peer audit policy to recover the decryption key, where m<N.

\* \* \* \* \*